US009090812B2

(12) United States Patent
Gerrard et al.

(10) Patent No.: US 9,090,812 B2
(45) Date of Patent: Jul. 28, 2015

(54) SELF-INHIBITED SWELL PACKER COMPOUND

(75) Inventors: David P. Gerrard, Magnolia, TX (US); James E. Goodson, Porter, TX (US); John C. Welch, Spring, TX (US); Anil K. Sadana, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 824 days.

(21) Appl. No.: 13/315,644

(22) Filed: Dec. 9, 2011

(65) Prior Publication Data
US 2013/0146312 A1 Jun. 13, 2013

(51) Int. Cl.
*C09K 8/44* (2006.01)
*C09K 8/512* (2006.01)
*C08L 9/02* (2006.01)
*E21B 33/12* (2006.01)

(52) U.S. Cl.
CPC . *C09K 8/512* (2013.01); *C08L 9/02* (2013.01); *C09K 8/44* (2013.01); *E21B 33/1208* (2013.01)

(58) Field of Classification Search
None
See application file for complete search history.

(56) References Cited

U.S. PATENT DOCUMENTS

| 5,836,392 | A * | 11/1998 | Urlwin-Smith | 166/295 |
| 7,470,452 | B1 * | 12/2008 | Flosbach et al. | 427/407.1 |
| 2003/0116317 | A1 | 6/2003 | Chang et al. | |
| 2004/0081911 | A1 * | 4/2004 | Noglik et al. | 430/270.1 |
| 2006/0111497 | A1 * | 5/2006 | Hochgesang | 524/431 |
| 2006/0122071 | A1 * | 6/2006 | Reddy et al. | 507/219 |
| 2006/0169455 | A1 * | 8/2006 | Everett et al. | 166/295 |
| 2009/0264321 | A1 | 10/2009 | Showalter et al. | |
| 2009/0264324 | A1 | 10/2009 | Kurian et al. | |
| 2009/0264325 | A1 * | 10/2009 | Atkins et al. | 507/226 |
| 2011/0120733 | A1 | 5/2011 | Vaidya et al. | |

FOREIGN PATENT DOCUMENTS

EP 0566118 * 4/1993

OTHER PUBLICATIONS

Johan Sterte, "Synthesis and Properties of Titanium Oxide Cross-Linked Montmorillonite," Clays and Clay Minerals, vol. 34, No. 6, 658-664, 1986.
International Preliminary Report on Patentability for related PCT Application No. PCT/US2012/063531, dated Jun. 10, 2014, pp. 1-6.
International Search Report for related PCT Application No. PCT/US2012/063531, dated Feb. 28, 2013, pp. 1-4.
Written Opinion for related PCT Application No. PCT/US2012/063531, dated Feb. 28, 2013, pp. 1-5.

* cited by examiner

*Primary Examiner* — Robert C Boyle
(74) *Attorney, Agent, or Firm* — Cantor Colburn LLP

(57) ABSTRACT

A downhole sealant includes a composition that includes a polymer; an absorbent material; a primary crosslink network including primary bonds between chains of the polymer; and a secondary crosslink network which is transient. A method of regulating the swell rate of the downhole sealant includes disposing a downhole sealant comprising a polymer and an absorbent material in a borehole; maintaining a primary crosslink network of the polymer; and decomposing a secondary crosslink network of the absorbent material in response to a condition to regulate the swell rate of the downhole sealant.

39 Claims, 9 Drawing Sheets

SELF-INHIBITED SWELL PACKER COMPOUND

BACKGROUND

A downhole tool such as a packer is used as an isolation device to seal a region in a borehole. Additionally, packers are often used to isolate sections of the borehole from one another. For example, a toroid-shaped packer can be used to fill the annular space between a production tube and the casing or wall of a borehole. In some circumstances, a disc- or column-shaped packer is used to isolate a borehole that is free of production tubing. With either application, the packer must tightly seat against the wall, casing, and production tubing (if present) to form an effective seal. Packers can form these seals by expanding to fill the void volume in the borehole. Expansion can occur by increasing the packer's volume via absorbing a fluid. The spotting position of the packer can occur at several thousand feet downhole. While traversing the borehole en route to this destination, the packer is typically in contact with the fluid in the borehole. Problems can occur when the packer absorbs this fluid and expands before reaching the target depth. When the packer expands, it may become stuck in an undesired position within the borehole. In this event, extraction of the packer may be required. This can be a costly and time-consuming process.

Devices, methods, and materials that overcome the above problems would be well-received by those skilled in the art.

BRIEF DESCRIPTION

A downhole sealant comprising: a composition comprising: a polymer; an absorbent material; a primary crosslink network comprising primary bonds between chains of the polymer; and a secondary crosslink network which is transient.

A method of regulating the swell rate of a downhole sealant, comprising: disposing a downhole sealant comprising a polymer and an absorbent material in a borehole; maintaining a primary crosslink network of the polymer; and decomposing a secondary crosslink network of the absorbent material in response to a condition to regulate the swell rate of the downhole sealant.

A composition comprising: a polymer; a copolymer; a cellulosic material; a primary crosslink network; and a secondary crosslink network which is labile compared to the primary crosslink network.

A system for sealing a borehole, comprising: a downhole sealant to seal the borehole, comprising: a polymer; an absorbent material; a primary crosslink network comprising bonds among chains of the polymer; and a secondary crosslink network comprising bonds between the absorbent material and the crosslinking agent, the secondary crosslink network being transient; and a decomposition agent to decompose the secondary crosslink network.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
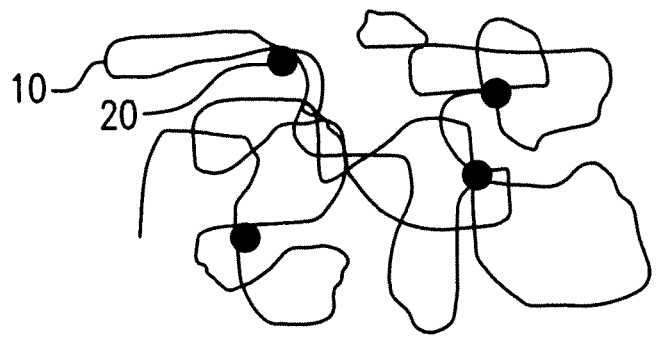
FIG. 1A shows a polymer with a primary crosslink network.

A detailed description of one or more embodiments of the disclosed apparatus and method are presented herein by way of exemplification and not limitation with reference to the Figures.

The inventors have discovered devices, compositions, and methods disclosed herein that selectively and controllably affect the swell rate of a downhole tool and also can lead to the inhibition of the onset of swelling of a downhole tool. To this end, the inventors have developed devices, compositions, and methods that control the swell rate, swell percentage, and relative hardness of a swellable downhole tool such as a packer. Embodiments of the devices, compositions, and methods ensure sufficient engagement with a borehole wall or casing for efficient isolation of desired sections of a borehole.

An ability of a composition used in downhole applications to swell by virtue of a large volume increase is a characteristic of an elastomer suitable for a swell packer in downhole applications. Control of the swell rate is important since swelling too fast may lead to the packer lodging in the casing during the trip downhole before reaching its target position.

The swell rate of such a composition, for example an elastomer, used in downhole applications is a function of the composition's absorption of fluid. Among the factors governing fluid absorption is the affinity for a given fluid by components of the composition and the crosslink density of a polymer in the composition. As the affinity increases, the absorption rate increases, and the volume of the composition increases to accommodate the absorbed fluid. Without wishing to be bound by theory, it is believed that the density of crosslinks of the polymer within the composition controls the expansion rate. In this vein, as the number of crosslinks in the polymer increases, the amount of fluid that can be absorbed decreases. Moreover, as the number of crosslinks decreases, the swell rate of the composition increases.

In an embodiment, a downhole tool includes a composition that has a polymer that provides the downhole tool with more than one swell rate. In an initial state, the polymer has a high crosslink density to restrict volumetric swell rate of the downhole tool. In a subsequent state, the polymer has a low crosslink density to enhance the volumetric swell rate of the downhole tool. By having more than one swell rate, the downhole tool can be used in numerous settings. In an embodiment, the downhole tool is a packer with more than one swell rate, which allows the packer to pack off at its intended downhole location without prematurely swelling to a size that inadvertently causes the packer to obstruct the borehole at an incorrect location. A polymer having more than one swell rate can be achieved by a having a primary crosslink network and a secondary crosslink network in which the density of crosslinks due to the secondary crosslink network decreases in response to a certain condition, such as temperature, pressure, pH, and the like.

According to an embodiment, a downhole sealant includes a swellable composition. The swellable composition includes a polymer, a primary crosslink network, and a secondary crosslink network. Additionally, the composition can include an absorbent material. In a non-limiting embodiment, the absorbent material contains a copolymer and cellulosic material. The primary crosslink network includes primary bonds between chains of the polymer. The secondary crosslink network is transient and/or reversible. In an embodiment, the secondary crosslink network has secondary bonds between the absorbent material and the crosslinking agent. Alternatively, the secondary crosslink network has secondary bonds between chains of the polymer and a crosslinking agent. In another embodiment, the secondary crosslink network has secondary bonds between any combination of the absorbent material, the crosslinking agent, and the polymer. The secondary bonds are labile with respect to the primary bonds. In this way, the secondary bonds of the secondary crosslink network break in response to a certain condition while the primary bonds of the primary crosslink network are maintained intact.

As used herein, "labile" refers to a relatively unstable and transient chemical species (or bond) or a relatively stable but reactive species (or bond). In either case, a first compound (or first bond) that is labile as compared with a second compound (or second bond) reacts (or breaks) before the second compound (or second bond).

The primary and secondary bonds can be covalent bonds, ionic bonds, hydrogen bonds, or physical bonds. In an embodiment, the primary bonds are bonds directly between functional groups of chains of the polymer. Further, the primary bonds may not have a linking or bridging unit between inter-bonded chains of the polymer. Alternatively, the primary crosslink network is established by bonds formed by a linking agent between the chains of the polymer. The primary crosslink network is longer-lived than the secondary crosslink network under conditions such as temperature, pressure, pH, salt concentration, and the like.

The polymer can be a homopolymer, random copolymer, alternating copolymer, block copolymer, graft copolymer, or an appropriate combination thereof. It should also be understood that unless otherwise noted herein, the term "polymer" comprises polymers of one monomer (as with homopolymers), copolymers, terpolymers, and polymeric forms of more than one type of monomer.

The composition disclosed herein provides excellent swelling volumes. The combination of at least two polymer families, as well as the optimization of other components, gives a rubber composition for use in downhole applications that will swell in fluids such as water-based muds or brines. In one non-limiting embodiment, a cellulose component, such as carboxy methyl cellulose (CMC), is used together with an acrylate copolymer (AC) that can increase the swelling capacity of an acrylonitrile butadiene rubber (NBR) in water to over 1000%. The amount and rate of swelling of the composition depend on the density of crosslinks of the polymer provided by a primary crosslink network and a secondary cross link network, which are discussed below. Briefly, the secondary crosslink network is labile with respect to the primary crosslink network, with the secondary crosslink network decomposing based on a condition such as temperature, pressure, pH, salinity of water, and the like.

In addition to the crosslink density, the swell amount is a function of the affinity of the polymer for a fluid. In an embodiment, the composition can be affected by the salinity of the water-based fluid. A lower concentration of monovalent cations from salts (e.g., NaCl, KCl) causes an increased swell rate and greater swelling of the composition. Similarly, a lower concentration of polyvalent cations from salts (e.g., $CaCl_2$) causes an increased swell rate and greater swelling of the composition. The composition can increase its original volume up to 150% in a typical downhole fluid containing 3.5 NaCl (typical salt water concentration) at temperatures from as low as 21° C. to as high as 127° C., and possibly as high as 149° C. In a nearly salt-free water environment, the composition can expand on a mandrel with sufficient rubber in the range of about 300 volume percent (vol. %) to about 400 vol. %. Increasing the volume of the composition by swelling in water, improves the ability of the elastomer composition to more completely and forcefully seal a borehole such as a well annulus and the like.

According to an embodiment, the swellable elastomer composition described herein is a nitrile-based formulation. A water-swelling copolymer that is emulsified in a nitrile soluble oil allows incorporation of this copolymer/oil mixture into the nitrile base polymer. In addition to these two materials, several other materials such as fillers and curatives can be added to give the rubber strength and suitable final properties. A cellulosic material can be added to composition to enhance fluid absorption.

The base polymer can be an acrylonitrile butadiene rubber (NBR) and/or any polymer that is tolerated by or compatible with a liquid dispersed polymer (LDP), which is described below. NBR is a family of unsaturated copolymers of 2-propenenitrile and various butadiene monomers (1,2-butadiene and 1,3-butadiene). Although its physical and chemical properties vary depending on the base polymer's content of acrylonitrile (the more acrylonitrile within the base polymer, the higher the resistance to oils but the lower the flexibility of the material), this form of synthetic rubber is generally resistant to oil, fuel, and other chemicals. Other types of NBR can also be used as the base polymer, for example, hydrogenated NBR (HNBR), carboxylated hydrogenated NBR (XHNBR), and NBR with some of the nitrile groups substituted by an amide group (referred to as amidated NBR or ANBR). Herein, NBR will pertain to any the aforementioned types. Suitable, but non-limiting examples of NBR include, but are not limited to NIPOL™ 1014 NBR available from Zeon Chemicals, LP; Perbunan NT-1846 from LanXess or N22L from JSR. Given a suitable LDP, other base polymers may include, but are not necessarily limited to, ethylene-propylene-diene monomer copolymer rubber (EPDM), synthetic rubbers based on polychloroprene (NEOPRENE™ polymers from DuPont), fluorinated polymer rubbers (e.g. FKM), tetrafluoro ethylene propylene rubbers (FEPM, such as AFLAS™ fluoroelastomers available from Asahi Glass Co. Ltd.), fluorosilicone rubber (FVMR), butyl rubbers (IIR), and the like.

Although NBR does not swell significantly in water, addition of an absorbent material such as an acrylic copolymer (AC) and a cellulosic material provide extremely high swelling capacity. In an embodiment, the acrylic copolymer is dispersed in a nitrile-compatible phthalate ester, and the cellulosic material is a carboxy methyl cellulose (CMC).

According to an embodiment, the acrylic copolymer is a mixture comprised of approximately 50% active polymer and 50% phthalate ester oil carrier. Examples of this material include, but are not necessarily limited to, those produced by CIBA Specialty Chemicals (UK) for use in PVC, as well as any other material generally regarded as a super absorbent polymer (SAP) in solid or liquid form. This oil/polymer blend is referred to herein as liquid dispersed polymer (LDP). However, it should be understood that other LDPs besides the above-described one are expected to be useful in the water swellable elastomer composition herein. In a non-limiting example, another potentially suitable LDP available from CIBA Specialty Chemicals is one that is based in either a paraffinic, naphthenic, or aromatic based oil or any combination thereof, which is compatible with EPDM. Thus, EPDM is another possibility for the base polymer herein, and other oils besides phthalate esters are also expected to be suitable. It will be appreciated that this LDP material can have ratios other than 50% polymer and 50% oil carrier and still be useful and effective for the purposes and elastomer compositions described herein. Another alternative material includes AQUALIC CS-6S, a water absorbent polymer available from Nippon Shokubai Co., Ltd. in solid powder form.

The composition benefits from the combined swelling effects of the LDP and the CMC. The rubber can swell with either alone, but there are physical limitations of adding each. For instance, the LDP can be a liquid, and the cellulose can be a dry powder. Without wishing to be limited to any particular explanation, it is believed that there is no or substantially little chemical interaction occurring between the two components. However, there may be a physical interaction of water transference between the two additives, although the inventors do not want to be restricted by this theory. There appears to be a synergistic effect between the two that ultimately yields a rubber composition that has more swelling ability, more desirable processing, and better physical properties as compared to otherwise identical composition where one or the other additive is not included. The CMC being a solid powder helps to absorb the oil portion of the LDP, contributes strength to the rubber as well as making the rubber less soft during processing while ultimately having a greater hardness when cured.

The amount of these three ingredients (NBR, LDP, and CMC) are about 15 weight percent (wt. %) to about 35 wt. % for each, based on the weight of the composition. Normally, the amount of component of rubber compositions is expressed in terms of parts per hundred parts rubber (phr). Such compositions start with 100 parts of raw polymer and then other materials are expressed in parts compared to that. In one non-limiting embodiment, the base polymer is 100 phr NBR and about 18 vol. % to about 52 vol. % ACN (acrylonitrile). In the composition, the amount of LDP is from about 80 phr to about 140 phr. This equivalent to about 40 phr to about 70 phr of the swelling AC or super absorbent polymer (SAP). The high oil content may become a limiting factor as to how much of the LDP may be physically added to the NBR. If a higher concentration of the swelling polymer was to become commercially available, then the phr range of 80-140 would still be applicable, however, the active level of polymer would increase beyond the current 40-70 phr range that should result in an elastomer capable of even higher swelling. The amount of the SAP would be thus be from about 50 phr to about 150 phr.

Examples of acrylic copolymers include, but are not limited to, copolymers of acrylic acid and its esters with other materials such as polyacrylamide copolymer, ethylene maleic anhydride copolymer, super absorbent polymer including crosslinked SAP, polyvinyl alcohol copolymers, crosslinked polyethylene oxide, and starch grafted copolymer of poly ACN. Cellulose is a general name and in general a commodity. One non-limiting, example is chemically referred to as carboxy methyl cellulose (CMC) and is generally sold under some form of this name. Other examples of CMC include AKUCELL™ AF3281 CMC available from Akzo Nobel, CMC from Aqualon, and CMC from Quingdae Rich Chemicals. Any other general cellulosic materials such as hydroxypropylmethyl cellulose (HPMC) or methylcellulose (MC) and combinations thereof that function to accomplish the properties and goals of the water swellable elastomer composition and which are compatible with the other components are acceptable for use herein.

According to an embodiment, the acrylic copolymer includes a super absorbent polymer (SAP). The SAP has a hydrophilic network that can retain large amounts of aqueous liquid relative to the weight of the SAP. Thus, SAPs herein can be a variety of organic polymers that react with or absorb water and swell when contacted with water. Non-limiting examples of such SAPs are poly 2-hydroxyethylacrylate, polyalkyl acrylate, poly methacrylamide, poly vinylpyrrolidone, and poly vinyl acetate. In addition, the SAP can be a copolymer of acrylamide with, for example, maleic anhydride, vinyl acetate, ethylene oxide, ethylene glycol, acrylonitrile, or a combination thereof. Production of SAPs can be from acrylamide (AM) or acrylic acid and its salts.

In an embodiment, the SAP is polymerized from nonionic, anionic, cationic monomers, or a combination thereof. Polymerization to form the SAP can be via free-radical polymerization, solution polymerization, gel polymerization, emulsion polymerization, dispersion polymerization, or suspension polymerization. Moreover, polymerization can be performed in aqueous phase, in inverse emulsion, or in inverse suspension.

Examples of nonionic monomers for making the SAP include nonionic monomers such as acrylamide, methacrylamide, N,N-di($C_1$-$C_8$ alkyl)acrylamide such as N,N-dimethylacrylamide, vinyl alcohol, vinyl acetate, allyl alcohol, hydroxyethyl methacrylate, acrylonitrile, and derivatives thereof. Such derivatives include, for example, acrylamide derivatives, specifically alkyl-substituted acrylamides or aminoalkyl-substituted derivatives of acrylamide or methacrylamide, and are more specifically acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide, N-tert-butylacrylamide, N-vinylformamide, N-vinylacetamide, acrylonitrile, methacrylonitrile, or a combination thereof.

Examples of anionic monomers for making the SAP include ethylenically unsaturated anionic monomers containing acidic groups selected from carboxylic group, sulphonic group, phosphonic group, and salts and derivatives thereof. In particular, the anionic monomer is a monomer such as acrylic acid, methacrylic acid, ethacrylic acid, maleic acid, maleic anhydride, fumaric acid, itaconic acid, α-chloroacrylic acid, β-cyanoacrylic acid, β-methylacrylic acid (crotonic acid), α-phenylacrylic acid, β-acryloyloxypropionic acid, sorbic acid, α-chlorosorbic acid, 2'-methylisocrotonic acid, cinnamic acid, p-chlorocinnamic acid, β-stearyl acid, citraconic acid, mesaconic acid, glutaconic acid, aconitic acid, 2-acrylamido-2-methylpropanesulphonic acid, allyl sulphonic acid, vinyl sulphonic acid, allyl phosphonic acid, and vinyl phosphonic acid.

Examples of cationic monomers for making the SAP include an N,N-di-$C_1$-$C_8$ alkylamino-$C_1$-$C_8$ alkylacrylate (e.g., N,N-dimethyl amino ethyl acrylate), N,N-di-$C_1$-$C_8$ alkylamino-$C_1$-$C_8$ alkylmethacrylate (e.g., N,N-dimethyl amino ethyl methacrylate), including quaternary forms (e.g., methyl chloride quaternary forms), diallyldimethyl ammonium chloride, N,N-di-$C_1$-$C_8$ alkylamino-$C_1$-$C_8$ alkylacrylamide, and the quaternary forms thereof such as acrylamidopropyl trimethyl ammonium chloride.

In an embodiment, the NBR polymer can be functionalized with a functional group that can be crosslinked by a crosslinking agent to form the secondary crosslink network. In an embodiment, these functional groups include hydroxy, carboxy, amide, amine, and the like. According to an embodiment the polymer includes a plurality of polymer chains. The polymer chains can be identical or different and can be one of above-listed polymers or copolymers.

Among the polymer chains, for example NBR, a primary crosslink network can be formed by crosslinking one polymer chain to another polymer chain or crosslinking the same chain to itself. The crosslinks of the primary crosslink network can be a product of crosslinking the polymer by sulfur, peroxide, urethane, metallic oxides, acetoxysilane, and the like. In particular, a sulfur or peroxide crosslinker is used. Crosslinking is further described below. Thus, the primary crosslink network is made of bonds (referred to as primary bonds for convenience) between chains of the polymer. These primary bonds exhibit considerable stability in a downhole environment.

Figure 1B:
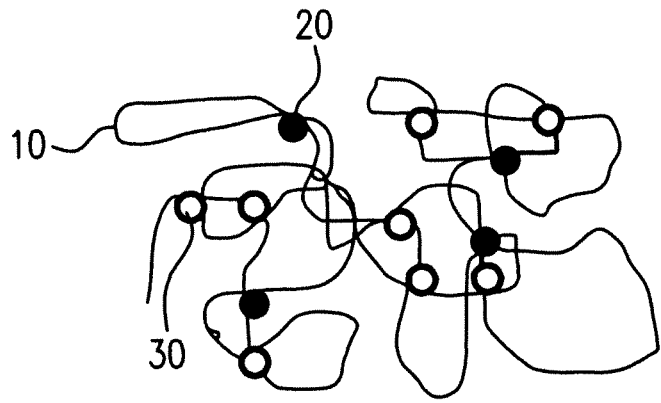
FIG. 1B shows the polymer of FIG. 1A after inclusion of a secondary crosslink network.
Figure 1C:
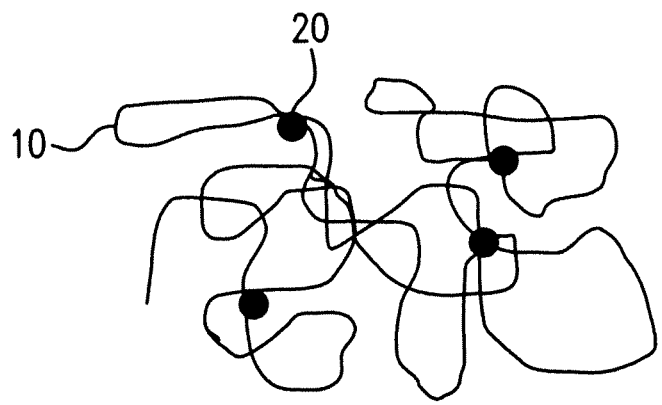
FIG. 1C shows the polymer of FIG. 1B after removal of the secondary crosslink network.

Beyond the primary crosslink network, the polymer chains can have a secondary crosslink network. In an embodiment, the secondary crosslink network includes labile bonds (referred to as secondary bonds for convenience) between chains of the polymer and a crosslinking agent. As shown in FIG. 1A, a polymer 10 has a primary crosslink network that includes crosslinks 20. The secondary crosslink network includes crosslinks 30 as in FIG. 1B. The secondary crosslink network can be removed (or substantially removed) from the polymer 10 in response to a condition (such as temperature, pressure, salinity, pH, and the like) while leaving the primary crosslink network intact as depicted in FIG. 1C.

Figure 2A:
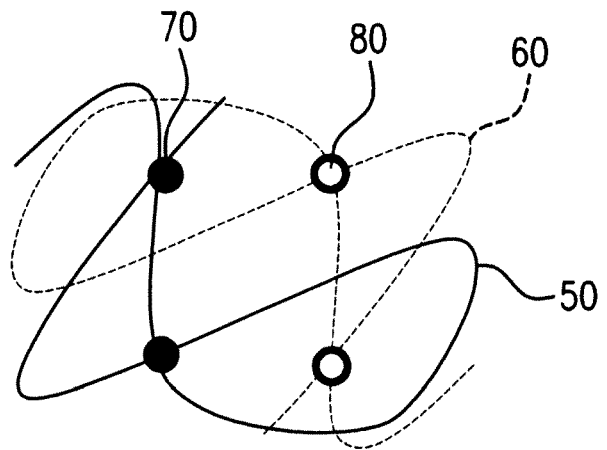
FIG. 2A shows a polymer having a primary crosslink network and an absorbent material having a secondary crosslink network.
Figure 2B:
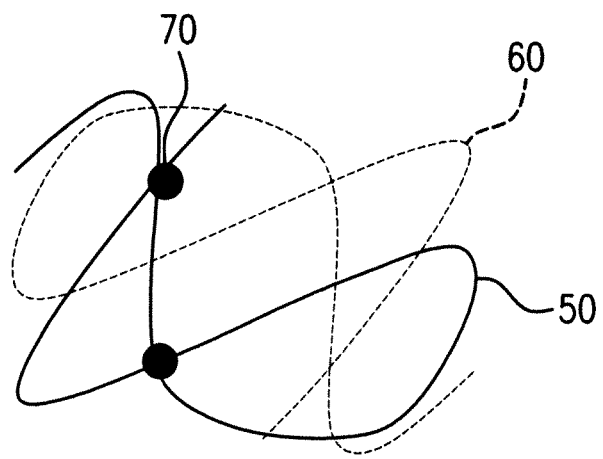
FIG. 2B shows the polymer with primary crosslink network and the absorbent material of FIG. 2A without the secondary crosslink network.

In another embodiment, the secondary crosslink network includes labile bonds (secondary bonds) between the absorbent material and a crosslinking agent. FIG. 2A shows a polymer 50 having a primary crosslink network 70 and an absorbent material 60 having a secondary crosslink network 80. The secondary crosslink network 80 can be removed (or substantially removed) from the absorbent material 60 in response to a condition (such as temperature, pressure, salinity, pH, and the like) while leaving the primary crosslink network 70 intact as depicted in FIG. 2B.

To form the secondary crosslink network, the crosslinking agent can be selected from a titanate, zirconate, aminocarboxylic acid, metal chelate, acrylate, borate, or a combination thereof.

According to an embodiment, the titanate has a structure such as that of formula 1,

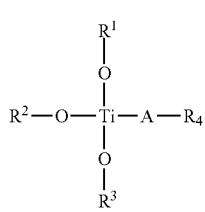

Formula 1 wherein A is halogen or oxygen;
$R^1$, $R^2$, $R^3$, and $R^4$ are independently hydrogen, optionally substituted alkyl, optionally substituted fluoroalkyl, optionally substituted cycloalkyl, optionally substituted heterocycloalkyl, optionally substituted aryl, optionally substituted aralkyl, optionally substituted heteroaryl, optionally substituted heteroaralkyl, optionally substituted, optionally substituted alkenyl, optionally substituted alkynyl, optionally substituted $NH_2$, optionally substituted amine, optionally substituted alkyleneamine, optionally substituted aryleneamine, optionally substituted alkenyleneamine; and
$R^4$ is not present when A is halogen.

Examples of the titanate of formula 1 include titanium(IV) diisopropoxide bis(acetylacetonate); titanium(IV) isopropoxide; titanium(IV) butoxide; titanium(IV) ethoxide; chlorotriisopropoxytitanium(IV); titanium(IV)bis(ammonium lactato)dihydroxide; titanium(IV) tert-butoxide; titanium (IV) 2-ethylhexyloxide; titanium(IV) isopropoxide; titanium (IV) methoxide; titanium(IV) propoxide; titanium(IV) (triethanolaminato)isopropoxide; titanium(IV) 2-ethylhexyloxide; titanium(IV)tetrahydrofulfuryloxide; titanium(IV)diisopropoxide bis(2,2,6,6-tetramethyl-3,5-heptanedionate); titanium(IV)tetra-2-ethylhexanoate; and octylene glycol titanate. The titanate can be selected from one of the aforementioned listed, a derivative thereof, a salt thereof, or a combination thereof.

The amount of the titanate is that amount required to sufficiently produce a desired density of the secondary crosslink network in the polymer as well as to affect a target swell rate. In an embodiment, the titanate is present in an amount from about 0.01 weight percent (wt. %) to about 10 wt. %, specifically from about 0.05 wt. % to about 5 wt. %, and more specifically about 0.1 wt. % to about 1 wt. %, based on the weight of the polymer.

In another embodiment, the crosslinking agent is a zirconate with a structure given by formula 2,

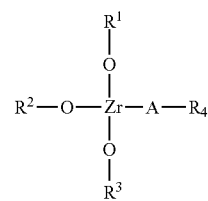

Formula 2 wherein A is halogen or oxygen;
$R^1$, $R^2$, $R^3$, and $R^4$ are independently hydrogen, optionally substituted alkyl, optionally substituted fluoroalkyl, optionally substituted cycloalkyl, optionally substituted heterocycloalkyl, optionally substituted aryl, optionally substituted aralkyl, optionally substituted heteroaryl, optionally substituted heteroaralkyl, optionally substituted, optionally substituted alkenyl, optionally substituted alkynyl, optionally substituted $NH_2$, optionally substituted amine, optionally substituted alkyleneamine, optionally substituted aryleneamine, optionally substituted alkenyleneamine; and
$R^4$ is not present when A is halogen.

Examples of the zirconate include zirconium(IV) acetylacetonate; zirconium(IV) acrylate, zirconium(IV) butoxide, zirconium(IV) tert-butoxide, zirconium(IV) carbonate; zirconium(IV) carbonate hydroxide; zirconium(IV) carboxyethyl acrylate, zirconium(IV)diisopropoxide bis(2,2,6,6-tetramethyl-3,5-heptanedionate); zirconium(IV) ethoxide; zirconium(IV) propoxide; zirconium (IV) methoxide; zirconium (IV) acetate hydroxide; zirconium(IV)bis(diethyl citrato) dipropoxide; zirconium(IV) isopropoxide; and zirconium (IV)trifluoroacetylacetonate. The zirconate can be selected from one of the aforementioned listed, a derivative thereof, a salt thereof, or a combination thereof.

The amount of the zirconate is that amount required to sufficiently produce a desired density of the secondary crosslink network in the polymer as well as to affect a target swell rate. In an embodiment, the titanate is present in an amount from about 0.01 weight percent (wt. %) to about 10 wt. %, specifically from about 0.05 wt. % to about 5 wt. %, and more specifically about 0.1 wt. % to about 1 wt. %, based on the weight of the polymer.

In a further embodiment, the crosslinking agent is an aminocarboxylic acid. Examples of the aminocarboxylic acid include alanine; 1,2-bis(o-aminophenoxy)ethane-N,N,N',N'-tetraacetic acid; 1,2-diaminocyclohexane-N,N,N',N'-tetraacetic acid; 1,4,7,10,-tetraazacyclododecane-N,N',N''-triacetic acid; 2,2',2'',2'''-(1,4,7,10-tetraazacyclododecane-1,4,7,10-tetrayl)tetraacetic acid; diethylenetriaminepentaacetic acid; ethylenediamine-N,N'-bis(2-hydroxyphenylacetic acid); ethylenediaminetetraacetic acid; ethylene-bis(oxyethylenenitrilo)tetraacetic acid; 2-{6-[bis(carboxymethyl)amino]-5-(2-{2-[bis(carboxymethyl)amino]-5-methylphenoxy}ethoxy)-1-benzofuran-2-yl}-1,3-oxazole-5-carboxylic acid; N,N'-di(2-hydroxybenzyl)ethylenediamine-N,N'-diacetic acid; (hydroxyethyl)ethylenediaminetriacetic acid; 1,4,7-tris(carboxymethyl)-10-(2'-hydroxy)propyl)-1,4,7,10-tetraazocyclodecane; iminodiacetic acid; 2-[4-(bis(carboxymethyl)amino)-3-[2-[2-(bis(carboxymethyl)amino)-5-methylphenoxy]ethoxy]phenyl]-1H-indole-6-carboxylic acid; (methylimino)diacetic acid; 2,2',2''-(1,4,7-triazanonane-1,4,7-triyl)triacetic acid; nitrilotriacetic acid; 2,2',2'',2'''-(1,4,8,11-tetraazacyclotetradecane-1,4,8,11-tetrayl)tetraacetic acid; and 3,6,9,12-tetrakis(carboxymethyl)-3,6,9,12-tetra-azatetradecanedioic acid. The aminocarboxylic acid can be selected from one of the aforementioned listed, a derivative thereof, a salt thereof, or a combination thereof.

The amount of the aminocarboxylic acid is that amount required to sufficiently produce a desired density of the secondary crosslink network in the polymer as well as to affect a target swell rate. In an embodiment, the titanate is present in an amount from about 0.01 weight percent (wt. %) to about 10 wt. %, specifically from about 0.05 wt. % to about 5 wt. %, and more specifically about 0.1 wt. % to about 1 wt. %, based on the weight of the polymer.

In yet another embodiment, the crosslinking agent is a metal chelate. The metal chelate includes a metal bonded to a chelation compound selected from lactate, malate, citrate, amincarboxylic acid listed above, or a combination thereof.

The metal of the metal chelate can be selected from lithium sodium, potassium, beryllium, magnesium, calcium, strontium, barium, radium, scandium, yttrium, lanthanum, titanium, vanadium, chromium, manganese, iron, cobalt, nickel, copper, zinc, zirconium, silver, cadmium, tin, hafnium, mercury, lead, aluminum, gallium, indium, thallium, bismuth, thorium, cerium, or a combination thereof.

In an embodiment, the metal chelate is a titanium chelate selected from titanium acetylacetonate, titanium triethanolamine, titanium lactate, di(ammonium lactate) titanate, titanium citrate, titanium malate, titanium-EDTA complex, titanium-BAPTA complex, titanium-DCTA complex, titanium-DO3A complex, titanium-DTPA complex, titanium-EGTA complex, titanium-HBED complex, titanium-HEDTA complex, titanium-HP-DO3A complex, titanium-Indo-1 complex, titanium-NOTA complex, titanium-TETA complex, titanium-TTHA complex, or a combination thereof. In an additional embodiment, the metal chelate is a zirconium chelate selected from zirconium acetylacetonate, zirconium triethanolamine, zirconium lactate, di(ammonium lactate) zirconate, zirconium citrate, zirconium malate, zirconium-EDTA complex, zirconium-BAPTA complex, zirconium-DCTA complex, zirconium-DO3A complex, zirconium-DTPA complex, zirconium-EGTA complex, zirconium-HBED complex, zirconium-HEDTA complex, zirconium-HP-DO3A complex, zirconium-Indo-1 complex, zirconium-NOTA complex, zirconium-TETA complex, zirconium-TTHA complex, or a combination thereof.

The amount of the metal chelate is that amount required to sufficiently produce a desired density of the secondary crosslink network in the polymer as well as to affect a target swell rate. In an embodiment, the metal chelate is present in an amount from about 0.01 weight percent (wt. %) to about 10 wt. %, specifically from about 0.05 wt. % to about 5 wt. %, and more specifically about 0.1 wt. % to about 1 wt. %, based on the weight of the polymer.

Figure 3A:
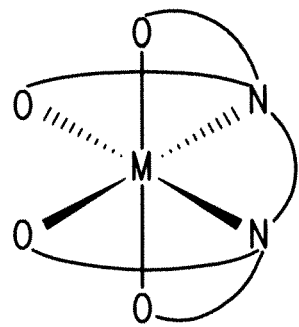
FIG. 3A shows a free metal chelate.

FIG. 3A shows an example of a metal M complexed to a chelation compound. Only atoms bound to the metal are shown with arcs illustrating bridge groups between coordinating atoms. For example, ethylenediaminetetraacetic acetate (EDTA) can bind nitrogen and oxygen atoms to the metal, with alkyl groups bridging these atoms. Although a hexadentate ligand is shown, it will be appreciated that the chelation compound can be a monodentate or multidentate ligand with a denticity not limited to being bidentatate, tridentate, quadradentate, pentadentate, and the like.

Figure 3B:
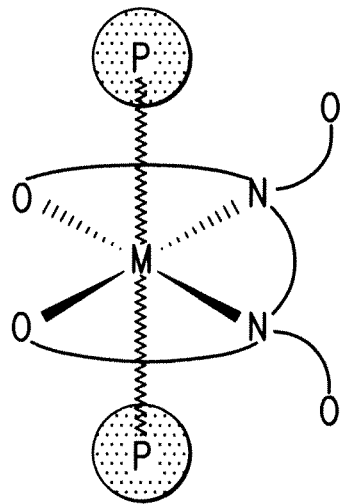
FIGS. 3B and 3C show metal chelates crosslinking two polymers.
Figure 3C:
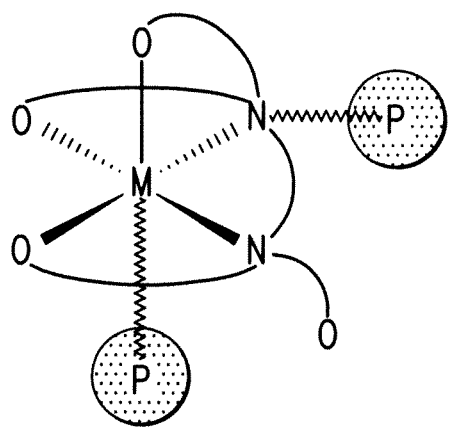

In an embodiment, a secondary crosslink network has a metal chelate bound to multiple polymer chains. These secondary bonds can involve binding between the polymer chains and the metal, a carbon or oxygen atom of the chelation compound, or a combination thereof. FIG. 3B illustrates bonds (shown as squiggly lines) formed between two polymer chains P and a metal M of a metal chelate. The oxygen-terminated groups of the chelation compound that are displaced by bonds between the metal and the polymer chains are depicted as free oxygen-terminated groups bound to nitrogen. In another embodiment, polymer chains can bond to the metal as well as an atom of the chelation compound, for example a nitrogen atom, as shown by the squiggly lines connecting the metal and the nitrogen atom to the polymer chains labeled as P in FIG. 3C. The other crosslinking agents disclosed herein have similar crosslinks with polymer chains to form the secondary crosslink network.

According to an embodiment, the crosslinking agent is an acrylate. As used herein, "acrylate" refers to a compound having a —C=C—C(=O)O— core structure with atoms having their valence filled with appropriate atoms or functional groups. Examples of such acrylates include acrylic acid, methacrylic acid, derivatives thereof, salts thereof, or a combination thereof. Further included are acrylate or methacrylate esters of di, tri, tetra hydroxy compounds, divinyl or diallyl compounds separated by an azo group such as the vinyl or allyl esters of di or tri functional acids, and combinations thereof. Examples of the acrylates include 1,4-butanediol diacrylate, 1,4-butanediol dimethacrylate, 1,3-butylene glycol diacrylate, 1,3-butylene glycol dimethacrylate, diethylene glycol diacrylate, diethylene glycol dimethacrylate, ethylene glycol diacrylate, ethylene glycol dimethacrylate, ethoxylated bisphenol A diacrylate, ethoxylated bisphenol A dimethacrylate, 1,6-hexanediol diacrylate, 1,6-hexanediol dimethacrylate, neopentyl glycol dimethacrylate, polyethylene glycol diacrylate, polyethylene glycol dimethacrylate, triethylene glycol diacrylate, triethylene glycol dimethacrylate, tripropylene glycol diacrylate, tetraethylene glycol diacrylate, tetraethylene glycol dimethacrylate, dipentaerythritol pentaacrylate, pentaerythritol tetraacrylate, pentaerythritol triacrylate, ethoxylated trimethylol triacrylate, ethoxylated pentaerythritol tetracrylate, trimethylolpropane triacrylate, trimethylolpropane trimethacrylate, cyclopentadiene diacrylate, tris(2-hydroxyethyl) isocyanurate triacrylate, and tris(2-hydroxyethyl) isocyanurate trimethacrylate.

The amount of the acrylate is that amount required to sufficiently produce a desired density of the secondary crosslink network in the polymer as well as to affect a target swell rate. In an embodiment, the acrylate is present in an amount from about 0.01 weight percent (wt. %) to about 10 wt. %, specifically from about 0.05 wt. % to about 5 wt. %, and more specifically about 0.1 wt. % to about 1 wt. %, based on the weight of the polymer.

The crosslinking agent in an additional embodiment is a ketal. Such ketals can have a formula such as follows:

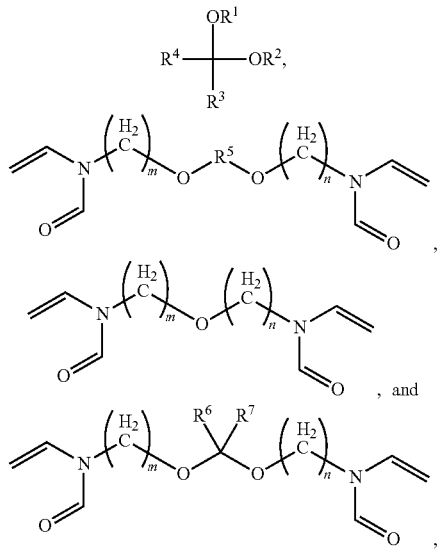

wherein m and n are independently an integer from 1 to 10; $R^1$, $R^2$, $R^3$, $R^4$, $R^5$, $R^6$, and $R^7$ are independently a lower alkyl, alkenyl, or aryl; and any of $R^1$, $R^2$, $R^3$, $R^4$ can link together to form a cyclic structure. In particular, non-limiting examples of the ketal are 2,2-dimethoxypropane, 2,2-bis(ethenyloxy)propane, 2,2-dimethyl-1,3-dioxolane, 1-ethoxy-1-methoxycyclopentane, 2-bis[2,2'-di(N-vinylformamido)ethoxy]propane (BDEP), 2-(N-vinylformamido)ethyl ether (NVFEE), and N-ethenyl-N-[(2-{2-[ethenyl(formyl)amino]ethoxy}ethoxy)methyl]formamide.

According to another embodiment, the crosslinking agent used to form the secondary crosslink network is a borate. The borate can be water soluble compounds that yield borate ions. Examples of the borate include boric acid, calcium metaborate, sodium metaborate, potassium metaborate, potassium tetraborate, sodium tetraborate, sodium metaborate tetrahydrate, sodium tetraborate decahydrate, and the like.

The borate can produce borate ions in an alkaline solution. Sparingly soluble borates, such as alkaline earth metal borates, alkali metal alkaline earth borates, and combinations thereof are further examples of suitable borates. Among sparingly soluble borates that produce borate ion in an alkaline solution are minerals such as probertite, ulexite, nobleite, gowerite, frolovite, colemanite, meyerhofferite, inyoite, priceite, tertschite, ginorite, pinnoite, paternoite, kurnakovite, inderite, preobazhenskite, hydroboracite, inderborite, kaliborite (heintzite), and vealchite.

Figure 4:
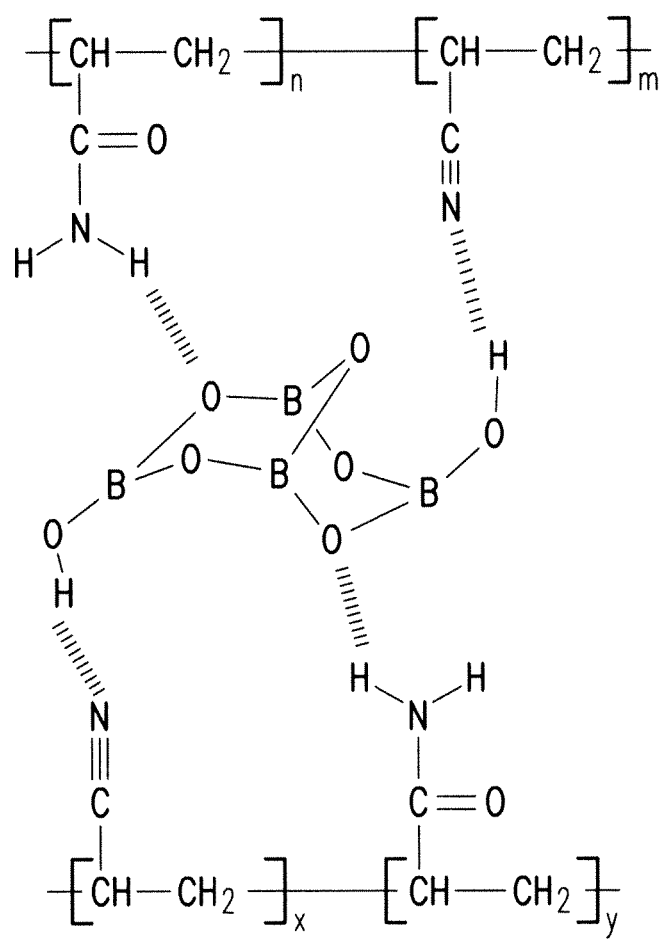
FIG. 4 shows a borate crosslinking agent bonded to two chains of a base polymer.
Figure 5:
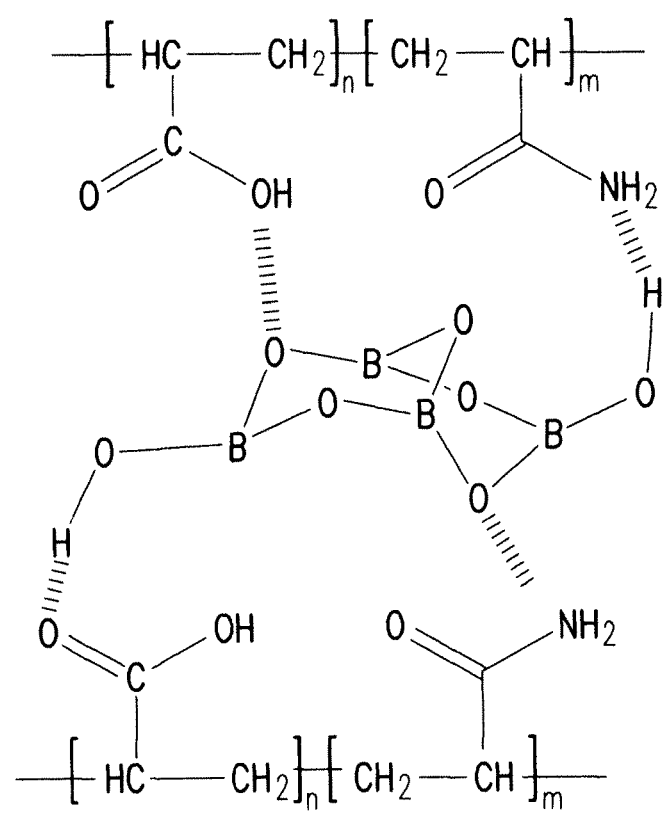
FIG. 5 shows a borate crosslinking agent bonded to two chains of an absorbent material.

An example of a crosslink formed by a borate is illustrated in FIG. 4. Here, protonated borate from sodium tetraborate crosslinks two polymer chains containing acrylamide groups and nitrile. Hydrogen bonds are shown as the dashed bonds between the borate and the functional groups on the two polymer chains. Although FIG. 4 depicts bonding that might occur when using a borate crosslinking agent, bonds between the polymers and the borate might exhibit a different configuration. A similar type of crosslink structure may occur for the acrylates. Additionally, FIG. 5 shows a portion of a secondary crosslink network involving a borate and carboxyl and amide groups of an absorbent material.

The amount of the borate is that amount required to sufficiently produce a desired density of the secondary crosslink network in the polymer as well as to affect a target swell rate. In an embodiment, the borate is present in an amount from about 0.01 weight percent (wt. %) to about 10 wt. %, specifically from about 0.05 wt. % to about 5 wt. %, and more specifically about 0.1 wt. % to about 1 wt. %, based on the weight of the polymer.

The composition containing the polymer including the primary crosslink network and the secondary crosslink network can be made in various ways. In an embodiment, a nitrile polymer such as NBR is compounded with an acrylate copolymer and cellulosic material. To establish the primary crosslink network, the polymer is crosslinked using sulfur. In addition to sulfur, an accelerator and optionally a metal oxide (e.g., zinc oxide), fatty acid (e.g., stearic acid), or combination thereof can be used. Examples of the accelerator include sulfonamide derivatives of 2-mercaptobenzothiazole and zinc dialkyldithiocarbamates. The accelerator can be present in amount from about 0.01 wt. % to about 1 wt. %, specifically about 0.05 wt. % to about 0.5 wt. %, and more specifically about 0.05 wt. % to about 0.1 wt. %, based on the weight of the polymer.

As an alternative to using sulfur to form the primary crosslink network, a peroxide can be used. Examples of the peroxide crosslinker include methyl ethyl ketone peroxide, benzoyl peroxide, acetone peroxide, t-amyl peroxybenzoate, t-hexyl peroxybenzoate, 1,3,3,3-tetramethylbutyl peroxybenzoate, t-amyl peroxy-m-methylbenzoate, t-hexyl peroxy-m-methylbenzoate, 1,1,3,3-tetramethylbutyl peroxy-m-methylbenzoate, t-hexyl peroxy-p-methylbenzoate, t-hexyl peroxy-o-methylbenzoate, t-hexyl peroxy-p-chlorobenzoate, bis(t-hexyl peroxy)phthalate, bis(t-amyl peroxy)isophthalate, bis(t-hexyl peroxy)isophthalate, bis(t-hexyl peroxy)terephthalate, tris(t-hexyl peroxy)trimellitate, 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane, n-butyl-4,4-bis(t-butylperoxy)valerate, di-t-butyl peroxide, dicumyl peroxide, t-butyl cumyl peroxide, α,α'-bis(t-butylperoxy-m-isopropyl)benzene, α,α'-bis(t-butylperoxy)diisopropylbenzene, 2,5-dimethyl-2,5-di(t-butylperoxy)hexane, acetyl peroxide; isobutyryl peroxide, octanoyl peroxide, decanoyl peroxide, lauroyl peroxide, 3,5,5-trimethyl hexanoyl peroxide, benzoyl peroxide, 2,4-dichlorobenzoyl peroxide, m-toluoyl peroxide, t-butyl peroxyacetate, t-butyl peroxyisophtalate, t-butyl peroxy-2-ethylhexanoate, t-butyl peroxylaurate, t-butyl peroxybenzoate, di-t-butyl peroxyisophthalate, 2,5-dimethyl-2,5-di(benzoylperoxy)hexane, t-butyl peroxymaleic acid, t-butyl peroxyisopropylcarbonate, cumyl peroxyoctate, t-butyl hydroperoxides, cumene hydroperoxides, diisopropylbenzene hydroperoxides, 2,5-dimethylhexane-2,5-dihydroperoxide, and 1,1,3,3-tetramethylbutyl hydroperoxide. These can be used alone or in combination. The peroxide can be present in amount from about 0.01 wt. % to about 10 wt. %, specifically about 0.1 wt. % to about 5 wt. %, and more specifically about 0.2 wt. % to about 1 wt. %, based on the weight of the polymer.

Figure 6:
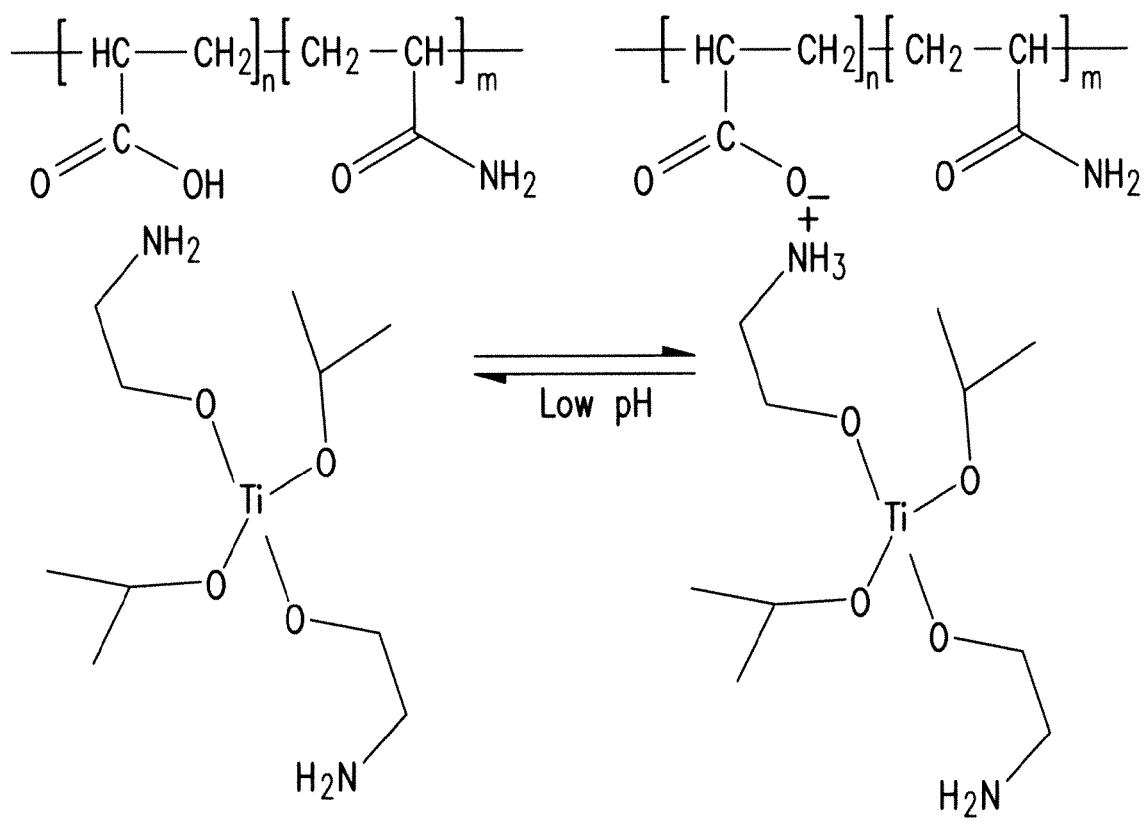
FIG. 6 shows an effect of the disruption of the secondary crosslink network by variation of the pH.

After forming the primary crosslink network, the polymer and absorbent material are combined with a crosslinking agent to form the secondary crosslink network. Here, for example, a borate (such as sodium tetraborate decahydrate) is combined with the NBR having the primary crosslink network, acrylate copolymer (e.g., SAP), and cellulosic material. In the method, the pH is adjusted to be alkaline so that the borate is protonated and dissociated from the cation of the borate salt. At alkaline pH, borate ions reversibly bind to the free functional groups of the absorbent material such as hydroxyl, carboxyl, or amide groups (see FIG. 5). In this manner, the secondary crosslink network is formed. One skilled in the art will appreciate that these labile bonds (e.g., borate-amide hydrogen bonds as shown in FIG. 5) can be broken by adjusting the pH or temperature. In an embodiment, the pH can be made alkaline to cause the secondary crosslink network to decompose as borate-functional group hydrogen bonds are broken. In an alternative embodiment, the temperature is raised above, for example, about 93° C. (200° F.), which causes the borate-polymer bonds to break due to their thermal lability. One skilled in the art will further appreciate that these bond formations and cleavages involved in the secondary crosslink network are reversible processes, depending on a condition such as the temperature, pH, and the like. That is, the bonds (also referred to herein as secondary bonds) between the crosslinking agent (e.g., borate) and the polymer chains that were broken by increasing the temperature or pH may be reformed by decreasing the temperature or pH. FIG. 6 illustrates the reversibility of forming and disrupting the secondary crosslink network for a titanate that crosslinks absorbent material. As shown in FIG. 6, the titanate is bound to the deprotonated carboxylate group of the absorbent material at a certain pH, whereas lowering the pH disrupts the bonds between the titanate and the absorbent material. As a result of lowering the pH, the amine group of the titanate is protonated and released by the protonated carboxyl group of the absorbent material.

In an embodiment, the polymer is compounded with an additive such as carbon black or silica before forming the primary crosslink network. Such additives can increase strength and elastomeric properties of the polymer. Furthermore, the secondary crosslink network can include crosslinks formed between the crosslinking agent and the additive.

The swellable elastomer compositions herein may find a wide variety of uses. A non-limiting embodiment is a downhole tool used in hydrocarbon recovery operations. In particular, the water-swellable compositions are expected to be useful as selectively deployed sealing elements for flow channels, particularly well flow channels such as annuli and the like. Suitable downhole tools for use in hydrocarbon exploration and recovery operations include, but are not necessarily limited to, well packers, bridge plugs, expandable pipes, or any other well tool requiring a swelling or expanding area to seal or block fluid flow. These tools once deployed, swollen, enlarged, and/or expanded are not desired to shrink and be extracted. In some non-limiting instances, the elastomeric seals may shrink should they no longer become in contact with an aqueous fluid and be allowed to "dry out," such as where production is alternating between hydrocarbon and water.

Figure 7:
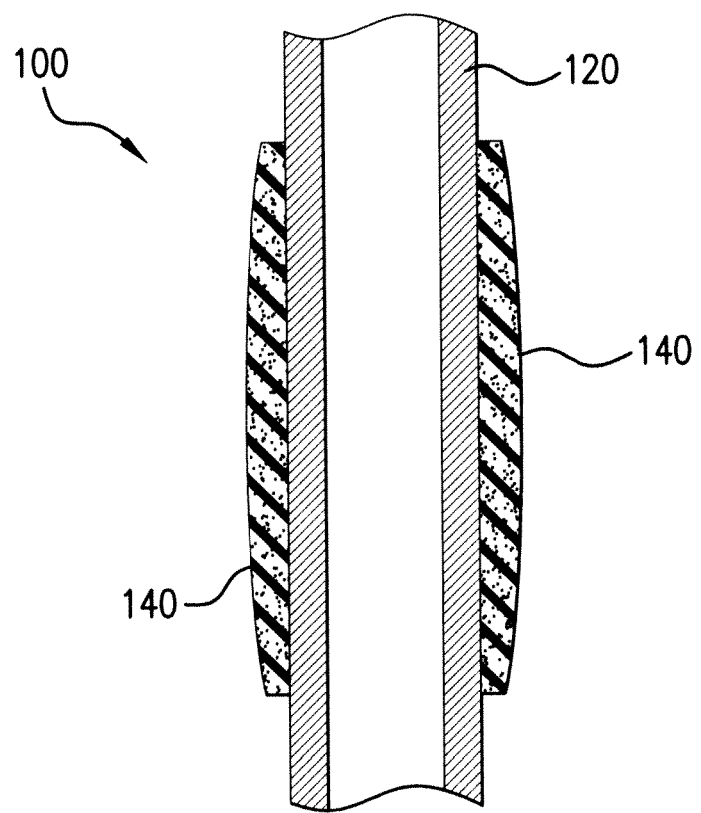
FIG. 7 shows a downhole sealant before removal of the secondary crosslink network.
Figure 8:
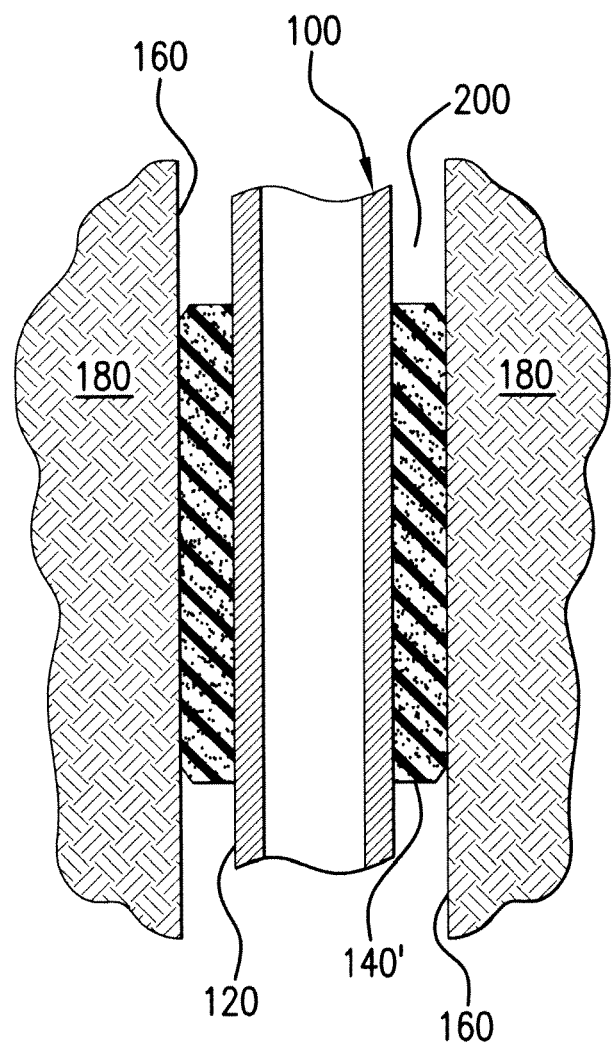
FIG. 8 shows the downhole sealant of FIG. 7 after the removal of the secondary crosslink network and deployment of the downhole sealant by fluid absorption.

An example of using the swellable elastomer composition described herein in a downhole tool, in a specific case a packer, is illustrated in FIGS. 7 and 8 where the overall downhole tool or downhole zone isolator (packer) 100 has a central support substrate or mandrel 120, shown in partial cross-section as of a generally tubular shape, around which has been formed a selectively deployed sealing element 140 of the swellable elastomer composition. The selectively deployed sealing element 140 has a first or initial size as seen in FIG. 7.

During run-in of the tool into the borehole, the selectively deployed sealing element 140 is in its first or initial state that will allow it to be easily put in the correct place downhole. In this initial state, the swellable composition has both the primary crosslink network and the secondary crosslink network. After contact with a fluid or another change in condition (for example, exposure to water or brine or a change in the pH, temperature, or pressure) the secondary crosslink network disappears, and the selectively deployed sealing element 140' will expand, swell or be deployed to a second shape and volume and will then conform to the borehole walls 160 of the subterranean formation 180. This will be some different or second size of the selectively deployed sealing element 140' as shown in FIG. 8. Here, the selectively deployed sealing element 140' has a greater volume than the initial or first size of the selectively deployed sealing element 140 shown in FIG. 7 due to absorption of fluid, which occurs after decomposition of the secondary crosslink network. In this manner, borehole 200 is sealed at this point. The water, brine, or other fluid used to deploy the selectively deployed sealing element 140 by degrading the secondary crosslink network can come from the fluid in the subterranean formation or can be pumped downhole from the surface.

In particular, the swellable elastomer compositions herein are expected to be used in borehole isolation products similar to the Reactive Element Packer (REPackers) and FORM-PAC™ packers, which are considered expandable tools, all available from Baker Oil Tools. Expandable tools are made from special pipe that is swaged when in place, which thins and expands the pipe to make it larger by about 20-25%. Adding or applying the swelling composition to the outside of this pipe allows the tool to seal in a slightly larger or irregular hole than the expandable pipe could do on its own.

Figure 9:
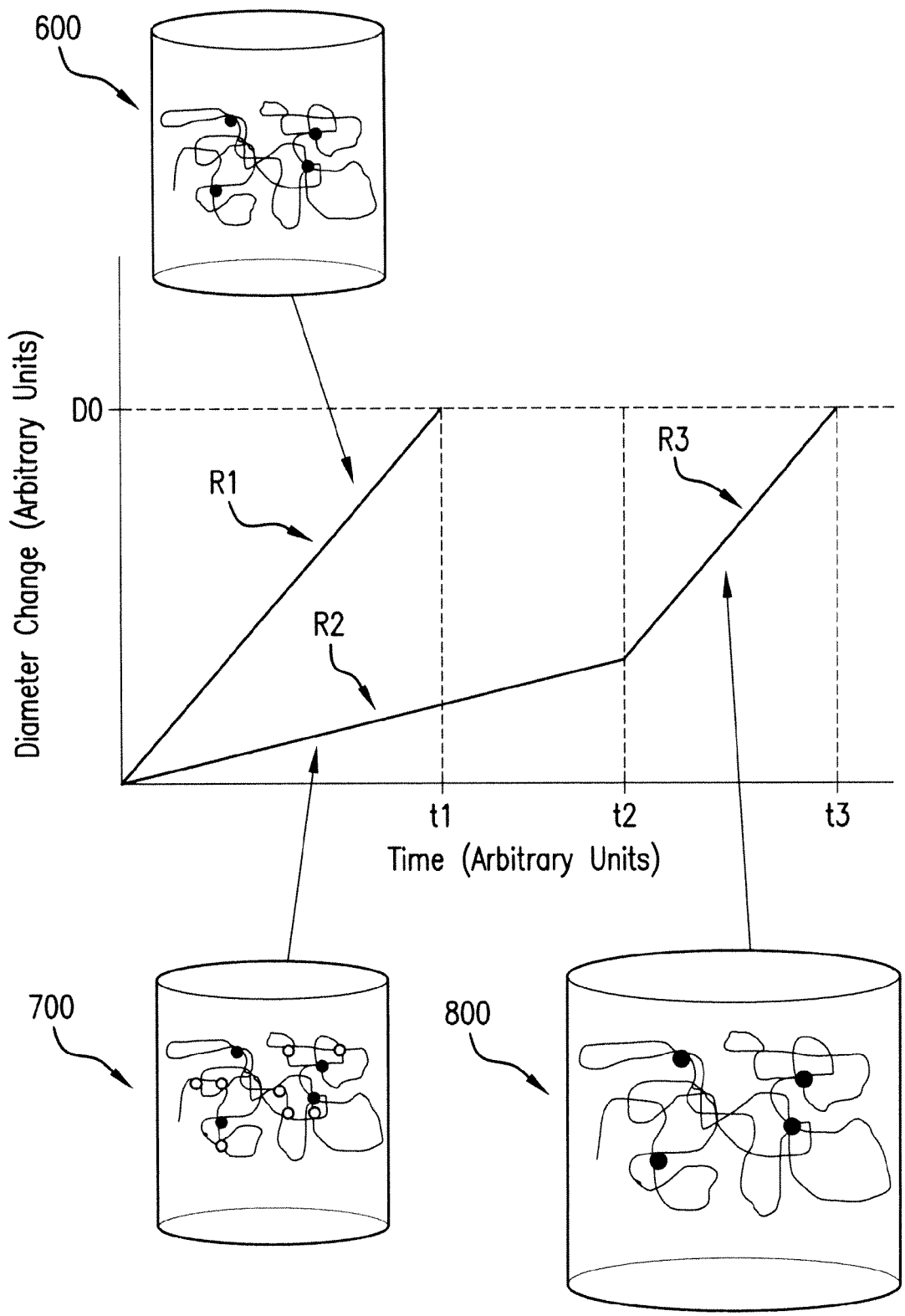
FIG. 9 shows a graph of diameter change versus time for packers having polymers with various crosslink networks.

The effect of the secondary crosslink network is further explained with reference to FIG. 9, which shows a graph of diameter change of two different packers versus time. A packer 600 having a swellable composition with a primary crosslink network but without a secondary crosslink network has a swell rate R1 given by the change in the diameter of the packer over time. The swell rate R1 of the packer 600 without the secondary crosslink network is considerable, and therefore the packer 600 may prematurely and inadvertently swell too rapidly and become stuck in the borehole before assuming its correct downhole position. The diameter $D_0$ of the borehole is indicated in FIG. 9. If the diameter of packer 600 exceeds the borehole diameter $D_0$ before reaching the correct pack-off position, the packer 600 may seal the borehole in an incorrect zone causing damage to equipment and loss of time. The packer 600 reaches the diameter $D_0$ of the borehole at time t1. In comparison, a packer 700 having a swellable composition with both a primary crosslink network and secondary crosslink network has two temporally separated swell rates R2 and R3. The first swell rate R2 is less than swell rate R1 because of the secondary crosslink network disallowing a high swell rate of the swellable composition. The packer 700 maintains swell rate R2 past time t1 and until time t2. At time t2, the diameter of the packer 700 is less than the borehole diameter $D_0$, and a condition (fluid exposure, change in pH, temperature, pressure, or and the like) occurs to stimulate breakdown and removal of the secondary crosslink network in the packer 700. At this point, the swell rate of the packer 700 increases from swell rate R2 to swell rate R3. Finally at time t3, the diameter of the packer (labeled as 800 in FIG. 9) has changed enough so the diameter of packer 800 attains the same size as the diameter $D_0$ of the borehole. As this point, the packer 800 isolates the borehole.

As illustrated above, in an embodiment, a method of regulating the swell rate of a downhole sealant includes disposing a downhole sealant comprising a polymer and an absorbent material in a borehole, maintaining a primary crosslink network of the polymer, and decomposing a secondary crosslink network of the absorbent material in response to a condition to regulate the swell rate of the downhole sealant. The method also includes stimulating the secondary crosslink network to increase the swell rate of the downhole sealant and sealing the borehole with the downhole sealant in response to decomposing the secondary crosslink network. According to another embodiment, the downhole sealant swells at a first rate before decomposing the secondary crosslink network and swells at a second rate after decomposing the secondary crosslink network. In certain embodiments, the first swell rate is less than or equal to the second swell rate. In yet another embodiment, the first swell rate is greater than the second swell rate. The condition that causes decomposing the second crosslink network is selected from a change in pH, temperature, pressure, salinity, or a combination thereof.

In an embodiment, the condition is adjusting the pH. In an instance when the crosslinking agent of the secondary crosslink network is a borate, the pH of the borehole fluid is adjusted to or maintained below about 7. Breaking the borate bonds with the polymer to decompose the secondary crosslink network can be achieved by adjusting the pH to at least about 8.0, specifically above about 8.5, and more specifically about 9.5 to about 12. In various embodiments, a pH control agent such as a hydroxyl ion releasing material and/or a buffering agent is employed to achieve a suitable pH. Non-limiting examples of the hydroxyl ion releasing agent include any soluble or partially soluble hydroxide or carbonate that provides the desirable pH value in the fluid to promote breakage of borate crosslinking with the polymer. The alkali metal hydroxides, e.g., sodium hydroxide, and carbonates can be used. Other acceptable materials include, for example, $Ca(OH)_2$, $Mg(OH)_2$, $Bi(OH)_3$, $Co(OH)_2$, $Pb(OH)_2$, $Ni(OH)_2$, $Ba(OH)_2$ and $Sr(OH)_2$. The amount of the hydroxyl ion source is that which is sufficient to yield a pH value in the fluid of at least about 8.0, specifically about 8.5, and more specifically about 9.5 to about 12.

In a further embodiment, a system for sealing a borehole includes a downhole sealant to seal the borehole. The downhole sealant includes a polymer, a primary crosslink network comprising bonds among chains of the polymer, and a secondary crosslink network comprising bonds between an absorbent material and a crosslinking agent, the secondary crosslink network being transient. The system further includes a decomposition agent to decompose the secondary crosslink network. In the system, the decomposition agent is selected from an acid, base, metal, chelation compound, breaker, brine, or a combination thereof.

In the swellable compositions herein, the mechanical properties and swelling behavior of such compositions can depend on crosslink density as noted above. The crosslink density refers to the mole fraction of monomer units that are crosslink points or refers to the number of cross linking bonds in a given volume or mass of the elastomeric material. The primary crosslink network can have a crosslink density greater than that of the secondary crosslink network. For instance, the primary crosslink network can have a first crosslink density. The first crosslink density can be a molar crosslink density from about $1 \times 10^{-6}$ moles to about $1 \times 10^4$ moles of crosslink per gram of polymer. The secondary crosslink network can have a second crosslink density (i.e., a molar crosslink density) from about $1 \times 10^{-6}$ to about $1 \times 10^4$ mole of crosslink per gram of polymer. The first crosslink density can be about 1% to about 300%, including, but not limited to about 5%, about 10%, about 25%, about 50%, about 100%, about 150%, about 200%, and about 250%, more than the second crosslink density. For example, the first crosslink density can be a molar crosslink density of about $1 \times 10^{-2}$ mole of crosslink per gram of polymer, and the second crosslink density can be a molar crosslink density of about $1 \times 10^{-4}$ mole of crosslink per gram of polymer.

The swell rate of the composition after removal of the secondary crosslink network can be about 1% to about 1000%, specifically about 1% to about 750%, more specifically about 1% to about 500%, and even more specifically about 1% to about 300%, the swell rate of the composition including both the primary crosslink network and the secondary crosslink network.

The swell percentage, or percent increase in volume of a given mass of swellable elastomeric composition, can be from less than about 1% to about 1000%, based on the initial (non-swollen) volume of the composition or device that includes the composition. For example, the swell percentage can be less than about 1%, about 1%, about 2%, about 4%, about 10%, about 100%, about 200%, about 300%, about 400%, or more than 400%.

The primary crosslink network and the secondary crosslink network can provide a swellable composition having strong mechanical properties, a controlled swelling rate, and a large swell percentage (after the secondary crosslink network is removed). The strong mechanical properties can allow the swellable composition to remain intact even in harsh borehole environments.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed, but that the invention will include all embodiments falling within the scope of the claims. Also, in the drawings and the description, there have been disclosed exemplary embodiments, and, although specific terms may have been employed, they are unless otherwise stated used in a generic and descriptive sense only and not for purposes of limitation, the scope of the invention therefore not being so limited.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorant). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed:

1. A downhole sealant having a controlled swell rate comprising:
   a composition comprising:
      a polymer;
      an absorbent material;
      a primary crosslink network comprising primary bonds between chains of the polymer; and
      a secondary crosslink network comprising secondary bonds between molecules of the absorbent material;
      wherein the secondary bonds are formed via a crosslinking agent comprising a titanate, zirconate, aminocarboxylic acid, metal chelate, borate, ketal, or a combination thereof and the secondary bonds are selectively broken in response to a change of pH, temperature, pressure, salinity, or a combination thereof, while leaving the primary bonds intact under the same conditions; and
   wherein the sealant swells and seals a borehole in response to decomposing the secondary crosslink network.

2. The downhole sealant of claim 1, wherein the secondary bonds are formed via a crosslinking agent.

3. The downhole sealant of claim 1, wherein the secondary bonds are covalent bonds, ionic bonds, hydrogen bonds, physical bonds, or a combination thereof.

4. The downhole sealant of claim 1, wherein the secondary bonds are broken at a pH of about 8 to about 10.

5. The downhole sealant of claim 1, wherein the secondary bonds are broken at a temperature of about 95° C. to about 150° C.

6. The downhole sealant of claim 1, wherein the secondary bonds are broken at a pressure of about 20 MPa to about 105 MPa.

7. The downhole sealant of claim 1, wherein the crosslinking agent is the titanate which has a structure given by formula 1,

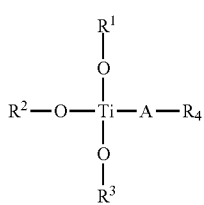

Formula 1 wherein A is halogen or oxygen;
$R^1$, $R^2$, $R^3$, and $R^4$ are independently hydrogen, optionally substituted alkyl, optionally substituted fluoroalkyl, optionally substituted cycloalkyl, optionally substituted heterocycloalkyl, optionally substituted aryl, optionally substituted aralkyl, optionally substituted heteroaryl, optionally substituted heteroaralkyl, optionally substituted, optionally substituted alkenyl, optionally substituted alkynyl, optionally substituted $NH_2$, optionally substituted amine, optionally substituted alkyleneamine, optionally substituted aryleneamine, optionally substituted alkenyleneamine; and
$R^4$ is not present when A is halogen.

8. The downhole sealant of claim 7, wherein the titanate is selected from titanium(IV)diisopropoxide bis(acetylacetonate); titanium(IV) isopropoxide; titanium(IV) butoxide; titanium(IV) ethoxide; chlorotriisopropoxytitanium(IV); titanium(IV)bis(ammonium lactato)dihydroxide; titanium(IV) tert-butoxide; titanium(IV) 2-ethylhexyloxide; titanium(IV) isopropoxide; titanium(IV) methoxide; titanium(IV) propoxide; titanium(IV) (triethanolaminato)isopropoxide; titanium(IV) 2-ethylhexyloxide; titanium(IV)tetrahydrofulfuryloxide; titanium(IV)diisopropoxide bis(2,2,6,6-tetramethyl-3,5-heptanedionate); titanium(IV)tetra-2-ethylhexanoate; octylene glycol titanate; or a combination thereof.

9. The downhole sealant of claim 1, wherein the titanate is present in an amount of about 0.01 wt. % to about 10 wt. % based on the weight of the polymer.

10. The downhole sealant of claim 1, wherein the crosslinking agent is the zirconate which has a structure given by formula 2,

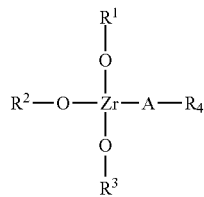

Formula 2 wherein A is halogen or oxygen;
$R^1$, $R^2$, $R^3$, and $R^4$ are independently hydrogen, optionally substituted alkyl, optionally substituted fluoroalkyl, optionally substituted cycloalkyl, optionally substituted heterocycloalkyl, optionally substituted aryl, optionally substituted aralkyl, optionally substituted heteroaryl, optionally substituted heteroaralkyl, optionally substituted, optionally substituted alkenyl, optionally substituted alkynyl, optionally substituted $NH_2$, optionally substituted amine, optionally substituted alkyleneamine, optionally substituted aryleneamine, optionally substituted alkenyleneamine; and
$R^4$ is not present when A is halogen.

11. The downhole sealant of claim 10, wherein the zirconate is selected from zirconium(IV) acetylacetonate; zirconium(IV) acrylate, zirconium(IV) butoxide, zirconium(IV) tert-butoxide, zirconium(IV) carbonate; zirconium(IV) carbonate hydroxide; zirconium(IV) carboxyethyl acrylate, zirconium(IV)diisopropoxide bis(2,2,6,6-tetramethyl-3,5-heptanedionate); zirconium(IV) ethoxide; zirconium(IV) propoxide; zirconium (IV) methoxide; zirconium(IV) acetate hydroxide; zirconium(IV)bis(diethyl citrato)dipropoxide; zirconium(IV) isopropoxide; zirconium(IV)trifluoroacetylacetonate; or a combination thereof.

12. The downhole sealant of claim 1, wherein the zirconate is present in an amount of about 0.01 wt. % to about 10 wt. % based on the weight of the polymer.

13. The downhole sealant of claim 1, wherein the crosslinking agent is the aminocarboxylic acid which is selected alanine; 1,2-bis(o-aminophenoxy)ethane-N,N,N',N'-tetraacetic acid; 1,2-diaminocyclohexane-N,N,N',N'-tetraacetic acid; 1,4,7,10,-tetraazacyclododecane-N,N',N'''-triacetic acid; 2,2',2'',2'''-(1,4,7,10-tetraazacyclododecane-1,4,7,10-tetrayl)tetraacetic acid; diethylenetriaminepentaacetic acid; ethylenediamine-N,N'-bis(2-hydroxyphenylacetic acid); ethylenediaminetetraacetic acid; ethylene-bis(oxyethylenenitrilo)tetraacetic acid; 2-{6-[bis(carboxymethyl)amino]-5-(2-{2-[bis(carboxymethyl)amino]-5-methylphenoxy}ethoxy)-1-benzofuran-2-yl}-1,3-oxazole-5-carboxylic acid; N,N'-di(2-hydroxybenzyl)ethylenediamine-N,N'-diacetic acid; (hydroxyethyl)ethylenediaminetriacetic acid; 1,4,7-tris(carboxymethyl)-10-(2'-hydroxyl)propyl)-1,4,7,10-tetraazocyclodecane; iminodiacetic acid; 2-[4-(bis(carboxymethyl)amino)-3-[2-[2-(bis(carboxymethyl)amino)-5-methylphenoxy]ethoxy]phenyl]-1H-indole-6-carboxylic acid; (methylimino)diacetic acid; 2,2',2''-(1,4,7-triazanonane-1,4,7-triyl)triacetic acid; nitrilotriacetic acid; 2,2',2'',2'''-(1,4,8,11-tetraazacyclotetradecane-1,4,8,11-tetrayl)tetraacetic acid; 3,6,9,12-tetrakis(carboxymethyl)-3,6,9,12-tetra-azatetradecanedioic acid; a derivative thereof; a salt thereof; or a combination thereof.

14. The downhole sealant of claim 1, wherein the aminocarboxylic acid is present in an amount of about 0.01 wt. % to about 10 wt. % based on the weight of the polymer.

15. The downhole sealant claim 1, wherein the crosslinking agent is the metal chelate which comprises a metal bonded to a chelation compound selected from lactate, malate, citrate, amincarboxylic acid, or a combination thereof.

16. The downhole sealant of claim 15, wherein the metal is selected from sodium, potassium, magnesium, calcium, strontium, barium, titanium, vanadium, chromium, manganese, iron, cobalt, nickel, copper, zinc, zirconium, silver, cadmium, tin, mercury, lead, aluminum, thorium, or a combination thereof.

17. The downhole sealant of claim 15, wherein the metal chelate is:
a titanium chelate selected from titanium acetylacetonate, titanium triethanolamine, titanium lactate, di(ammonium lactate) titanate, titanium citrate, titanium-EDTA complex, titanium-BAPTA complex, titanium-DCTA complex, titanium-DO3A complex, titanium-DTPA complex, titanium-EGTA complex, titanium-HBED complex, titanium-HEDTA complex, titanium-HP-DO3A complex, titanium-Indo-1 complex, titanium-NOTA complex, titanium-TETA complex, titanium-TTHA complex, or a combination thereof;
zirconium chelate selected from zirconium acetylacetonate, zirconium triethanolamine, zirconium lactate, di(ammonium lactate) zirconate, zirconium citrate, zirconium-EDTA complex, zirconium-BAPTA complex, zirconium-DCTA complex, zirconium-DO3A complex, zirconium-DTPA complex, zirconium-EGTA complex, zirconium-HBED complex, zirconium-HEDTA complex, zirconium-HP-DO3A complex, zirconium-Indo-1 complex, zirconium-NOTA complex, zirconium-TETA complex, zirconium-TTHA complex, or a combination thereof; or
a combination thereof.

18. The downhole sealant of claim 1, wherein the metal chelate is present in amount from about 0.01 wt. % to about 10 wt. % based on the weight of the polymer.

19. The downhole sealant of claim 15, wherein the metal of the metal chelate is bonded to the polymer.

20. The downhole sealant of claim 15, wherein a carbon or oxygen of the chelation compound of the metal chelate is bonded to the polymer.

21. The downhole sealant of claim 1, wherein crosslinking agent is the borate which is sodium tetraborate, boric acid, calcium metaborate, sodium metaborate, potassium metaborate, potassium tetraborate, sodium tetraborate, sodium metaborate tetrahydrate, sodium tetraborate decahydrate, or a combination thereof.

22. The downhole sealant of claim 1, wherein the crosslinking agent has a formula given by:

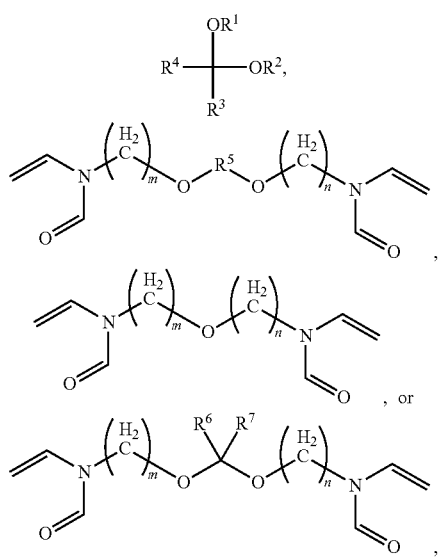

wherein m and n are independently an integer from 1 to 10; $R^1, R^2, R^3, R^4, R^5, R^6$, and $R^7$ are independently a lower alkyl, alkenyl, or aryl; and any of $R^1, R^2, R^3, R^4$ can link together to form a cyclic structure.

23. The downhole sealant of claim 22, wherein the ketal is 2,2-dimethoxypropane, 2,2-bis(ethenyloxy)propane, 2,2-dimethyl-1,3-dioxolane, 1-ethoxy-1-methoxycyclopentane, 2-bis[2,2'-di(N-vinylformamido)ethoxy]propane (BDEP), 2-(N-vinylformamido)ethyl ether (NVFEE), N-ethenyl-N-[(2-{2-[ethenyl(formyl)amino]ethoxy}ethoxy)methyl]formamide, or a combination thereof.

24. The downhole sealant of claim 1, wherein the primary crosslink network is a product crosslinking the polymer by sulfur.

25. The downhole sealant of claim 1, wherein the primary crosslink network is a product crosslinking the polymer by a peroxide.

26. The downhole sealant of claim 1, wherein the absorbent material is an acrylamide copolymer.

27. A method of regulating the swell rate of a downhole sealant, comprising:
disposing a downhole sealant of claim 1 in a borehole;
maintaining the primary crosslink network of the polymer; and
decomposing the secondary crosslink network of the absorbent material in response to a condition to regulate the swell rate of the downhole sealant.

28. The method of claim 27, further comprising stimulating the secondary crosslink network to increase the swell rate of the downhole sealant.

29. The method of claim 27, further comprising sealing the borehole with the downhole sealant in response to decomposing the secondary crosslink network.

30. The method of claim 27, wherein the downhole sealant swells at a first rate before decomposing the secondary crosslink network and swells at a second rate after decomposing the secondary crosslink network.

31. The method of claim 30, wherein the first rate is less than or equal to the second rate.

32. The method of claim 30, wherein the first rate is greater than the second rate.

33. The method of claim 27, wherein the condition is selected from a change in pH, temperature, pressure, salinity, or a combination thereof.

34. A composition comprising:
   a polymer;
   a copolymer;
   a cellulosic material;
   a primary crosslink network; and
   a secondary crosslink network which is labile compared to the primary crosslink network;
   wherein the secondary crosslink is selectively broken in response to a change of pH, temperature, pressure, salinity, or a combination thereof, while leaving the primary crosslink intact under the same conditions; and
   wherein the composition on swells and seals a borehole in response to decomposing the secondary crosslink network.

35. A system for sealing a borehole, comprising:
   a downhole sealant of claim 1; and
   a decomposition agent to decompose the secondary crosslink network.

36. The system of claim 35, wherein the decomposition agent is selected from an acid, base, metal, chelation compound, breaker, brine, or a combination thereof.

37. A downhole sealant having a controlled swell rate comprising:
   a composition comprising:
      a polymer comprising a nitrile polymer;
      an absorbent material;
      a primary crosslink network comprising secondary bonds between molecules of the absorbent material;
      a secondary crosslink network comprising secondary bonds between molecules of the absorbent material;
      wherein the secondary bonds are selectively broken in response to a change of pH, temperature, pressure, salinity, or a combination thereof, while leaving the primary bonds intact under the same conditions;
      wherein the sealant swells and seals a borehole in response to decomposing the secondary crosslink network.

38. A downhole sealant having a controlled swell rate comprising:
   a composition comprising:
      a polymer;
      an absorbent material;
      a primary crosslink network comprising primary bonds between chains of the primary; and
      a secondary crosslink network comprising secondary bonds between molecules of the absorbent material;
   wherein the secondary bonds are formed via a crosslinking agent comprising a titanate, zirconate, aminocarboxylic acid, metal chelate, borate, ketal, or a combination thereof and are selectively broken in response to a change of pH, temperature, pressure, salinity, or a combination thereof, while leaving the primary bonds intact under the same conditions;
   wherein the sealant swells and seals a borehole in response to decomposing the secondary crosslink network; and
   wherein the composition further comprises a cellulosic material.

39. The downhole sealant of claim 38, wherein the cellulosic material is carboxy methyl cellulose.

* * * * *

UNITED STATES PATENT AND TRADEMARK OFFICE
CERTIFICATE OF CORRECTION

PATENT NO. : 9,090,812 B2
APPLICATION NO. : 13/315644
DATED : July 28, 2015
INVENTOR(S) : David P. Gerrard et al.

It is certified that error appears in the above-identified patent and that said Letters Patent is hereby corrected as shown below:

In the claims

Claim 37, Column 22, Lines 4 and 5

Delete "secondary bonds between molecules of the absorbent material" and insert --primary bonds between chains of the polymer--.

Claim 38, Column 22, Line 20

Delete "between chains of the primary" and insert --between chains of the polymer--.

Signed and Sealed this
Ninth Day of August, 2016

Michelle K. Lee
*Director of the United States Patent and Trademark Office*